United States Patent
Gregory et al.

(10) Patent No.: US 10,746,548 B2
(45) Date of Patent: Aug. 18, 2020

(54) RING GYROSCOPE STRUCTURAL FEATURES

(71) Applicant: Analog Devices, Inc., Norwood, MA (US)

(72) Inventors: Jeffrey A. Gregory, Malden, MA (US); Igor P. Prikhodko, Wakefield, MA (US)

(73) Assignee: Analog Devices, Inc., Norwood, MA (US)

( * ) Notice: Subject to any disclaimer, the term of this patent is extended or adjusted under 35 U.S.C. 154(b) by 360 days.

(21) Appl. No.: 14/532,256

(22) Filed: Nov. 4, 2014

(65) Prior Publication Data

US 2016/0123735 A1    May 5, 2016

(51) Int. Cl.
*G01C 19/5677*   (2012.01)
*G01C 19/5684*   (2012.01)
*G01C 19/567*    (2012.01)

(52) U.S. Cl.
CPC ....... *G01C 19/5684* (2013.01); *G01C 19/567* (2013.01); *G01C 19/5677* (2013.01)

(58) Field of Classification Search
CPC ............ G01C 19/5677; G01C 19/5684; G01C 19/567
See application file for complete search history.

(56) References Cited

U.S. PATENT DOCUMENTS

| | | | |
|---|---|---|---|
| 3,656,354 A | 4/1972 | Lynch | 73/505 |
| 4,655,081 A | 4/1987 | Burdess | 73/505 |
| 4,809,589 A | 3/1989 | Bertrand | 92/98 R |

(Continued)

FOREIGN PATENT DOCUMENTS

| | | | | |
|---|---|---|---|---|
| EP | 0860685 | 8/1998 | ............ | G01C 19/56 |
| EP | 1788385 | 5/2007 | ............ | G01N 29/02 |

(Continued)

OTHER PUBLICATIONS

Title: High-frequency capacitive disk gyroscopes in (100) and (111) silicon; URL: https://ieeexplore.ieee.org/document/4433009 (Year: 2007).*

(Continued)

*Primary Examiner* — Jill E Culler
*Assistant Examiner* — Ruben C Parco, Jr.
(74) *Attorney, Agent, or Firm* — Wolf, Greenfield & Sacks, P.C.

(57) ABSTRACT

Novel structural features applicable to a variety of inertial sensors. A composite ring composed of concentric subrings is supported by a compliant support structure suspending the composite ring relative to a substrate. The compliant support structure may either be interior or exterior to the composite ring. The compliant support may be composed of multiple substantially concentric rings coupled to neighboring rings by transverse members regularly spaced at intervals that vary with radius relative to a central axis of symmetry. Subrings making up the composite ring may vary in width so as to provide larger displacement amplitudes at intermediate radii, for example. In other embodiments, electrodes are arranged to reduce sensitivity to vibration and temperature, and shock stops are provided to preclude shorting in response to shocks.

20 Claims, 8 Drawing Sheets

(56) References Cited

U.S. PATENT DOCUMENTS

| | | | |
|---|---|---|---|
| 5,177,579 A | 1/1993 | Jerman | 73/724 |
| 5,226,321 A | 7/1993 | Varnham et al. | 73/505 |
| 5,383,362 A | 1/1995 | Putty et al. | 73/505 |
| 5,450,751 A | 9/1995 | Putty et al. | 73/504.18 |
| 5,589,082 A | 12/1996 | Lin et al. | 216/2 |
| 5,616,864 A | 4/1997 | Johnson et al. | 73/504.04 |
| 5,652,374 A | 7/1997 | Chia et al. | 73/1.38 |
| 5,750,899 A | 5/1998 | Hegner et al. | 73/756 |
| 5,767,405 A | 6/1998 | Bernstein et al. | 73/504.16 |
| 5,783,749 A | 7/1998 | Lee et al. | 73/504.12 |
| 5,915,276 A | 6/1999 | Fell | 73/504.13 |
| 5,937,275 A | 8/1999 | Munzel et al. | 438/50 |
| 5,992,233 A | 11/1999 | Clark | 73/514.35 |
| 6,105,427 A | 8/2000 | Stewart et al. | 73/514.32 |
| 6,128,954 A | 10/2000 | Jiang | 73/504.13 |
| 6,151,964 A | 11/2000 | Nakajima | 73/504.13 |
| 6,158,280 A | 12/2000 | Nonomura et al. | 73/504.04 |
| 6,209,393 B1 | 4/2001 | Tomikawa et al. | 73/504.12 |
| 6,240,781 B1 | 6/2001 | Namerikawa | 73/504.13 |
| 6,343,509 B1 | 2/2002 | Fell et al. | 73/504.13 |
| 6,401,534 B1 | 6/2002 | Fell et al. | 73/504.13 |
| 6,438,242 B1 | 8/2002 | Howarth | 381/190 |
| 6,635,509 B1 | 10/2003 | Ouellet | 438/106 |
| 6,848,305 B2 | 2/2005 | Fell et al. | 73/504.13 |
| 6,877,374 B2 | 4/2005 | Geen | 73/504.14 |
| 6,892,575 B2 | 5/2005 | Nasiri et al. | 73/504.12 |
| 6,958,566 B2 | 10/2005 | Nguyen et al. | 310/321 |
| 6,978,674 B2 | 12/2005 | Fell et al. | 73/504.13 |
| 6,985,051 B2 | 1/2006 | Nguyen et al. | 333/186 |
| 7,032,451 B2 | 4/2006 | Geen | 73/504.14 |
| 7,043,985 B2 | 5/2006 | Ayazi et al. | 73/504.14 |
| 7,051,590 B1 | 5/2006 | Lemkin et al. | 73/504.04 |
| 7,089,792 B2 | 8/2006 | Geen | 73/504.14 |
| 7,123,111 B2 | 10/2006 | Brunson et al. | 331/116 M |
| 7,178,378 B2 | 2/2007 | Crawley et al. | 73/24.06 |
| 7,204,144 B2 | 4/2007 | Geen | 73/504.14 |
| 7,216,539 B2 | 5/2007 | Geen | 73/504.14 |
| 7,216,541 B2 | 5/2007 | Kato et al. | 73/514.32 |
| 7,357,025 B2 | 4/2008 | Geen | 73/504.12 |
| 7,420,318 B1 | 9/2008 | Pulskamp | 310/328 |
| 7,427,819 B2 | 9/2008 | Hoen et al. | 310/320 |
| 7,444,870 B2 | 11/2008 | Uchlyama et al. | 73/504.12 |
| 7,492,241 B2 | 2/2009 | Piazza et al. | 333/189 |
| 7,543,496 B2 | 6/2009 | Ayazi et al. | 73/504.12 |
| 7,551,043 B2 | 6/2009 | Nguyen et al. | 333/186 |
| 7,578,186 B2 | 8/2009 | Matsuhisa | 73/504.12 |
| 7,581,443 B2 | 9/2009 | Kubena et al. | 73/504.12 |
| 7,617,727 B2 | 11/2009 | Watson | 73/504.13 |
| 7,637,156 B2 | 12/2009 | Araki et al. | 73/504.13 |
| 7,874,209 B2 | 1/2011 | Stewart | 73/504.01 |
| 7,878,060 B2 | 2/2011 | Yoshikawa | 73/504.04 |
| 7,895,892 B2 | 3/2011 | Aigner | 73/504.01 |
| 7,950,281 B2 | 5/2011 | Hammerschmidt | 73/504.04 |
| 8,011,246 B2 | 9/2011 | Stewart | |
| 8,056,413 B2 | 11/2011 | Yazdi | 73/504.13 |
| 8,146,425 B2 | 4/2012 | Zhang et al. | 73/514.32 |
| 8,166,816 B2 | 5/2012 | Ayazi et al. | 73/504.12 |
| 8,250,919 B2 | 8/2012 | Ofri et al. | 73/504.13 |
| 8,372,677 B2 | 2/2013 | Mehregany | 438/51 |
| 8,408,060 B2 | 4/2013 | Kuang et al. | 73/504.13 |
| 8,464,585 B2 | 6/2013 | Raman et al. | 73/504.12 |
| 8,616,056 B2 | 12/2013 | Sammoura et al. | 73/504.13 |
| 8,631,700 B2 | 1/2014 | Sammoura et al. | 73/504.12 |
| 9,091,544 B2 | 7/2015 | Johari-Galle | 73/504.13 |
| 2002/0029637 A1 | 3/2002 | Matsumoto et al. | 73/504.01 |
| 2003/0051550 A1 | 3/2003 | Nguyen et al. | 73/514.36 |
| 2003/0119220 A1 | 6/2003 | Mlcak et al. | 438/52 |
| 2003/0183888 A1 | 10/2003 | Bar-Sadeh et al. | 257/419 |
| 2004/0050160 A1 | 3/2004 | Bae et al. | 73/504.13 |
| 2004/0051595 A1 | 3/2004 | Yoshimine et al. | 331/158 |
| 2004/0055380 A1* | 3/2004 | Shcheglov | G01C 19/5684 73/504.12 |
| 2004/0085000 A1 | 5/2004 | Ogiura | 310/329 |
| 2004/0134279 A1 | 7/2004 | Fell et al. | 73/504.13 |
| 2005/0072230 A1 | 4/2005 | Koike et al. | 73/504.12 |
| 2005/0104675 A1* | 5/2005 | Brunson | G01C 19/5684 331/108 C |
| 2005/0148065 A1 | 7/2005 | Zhang et al. | 435/287.2 |
| 2006/0133953 A1 | 6/2006 | Zhang et al. | 422/58 |
| 2006/0196253 A1 | 9/2006 | Crawley et al. | 73/53.01 |
| 2006/0197411 A1 | 9/2006 | Hoen et al. | 310/320 |
| 2006/0237806 A1 | 10/2006 | Martin et al. | 257/415 |
| 2006/0238078 A1 | 10/2006 | Liu | 310/338 |
| 2007/0046398 A1 | 3/2007 | Nguyen et al. | 333/186 |
| 2007/0172940 A9 | 7/2007 | Manalis et al. | 435/287.2 |
| 2007/0220971 A1 | 9/2007 | Ayazi et al. | 73/504.02 |
| 2007/0256495 A1 | 11/2007 | Watson | 73/504.12 |
| 2007/0284971 A1 | 12/2007 | Sano et al. | 310/364 |
| 2008/0054759 A1 | 3/2008 | Ayazi et al. | 310/309 |
| 2008/0168838 A1 | 7/2008 | Martin et al. | 73/514.32 |
| 2008/0180890 A1 | 7/2008 | Bolis | 361/679 |
| 2008/0190181 A1 | 8/2008 | Khuri-Yakub et al. | 73/64.53 |
| 2008/0282833 A1 | 11/2008 | Chaumet | 74/5 R |
| 2009/0064782 A1 | 3/2009 | Yazdi | 73/504.13 |
| 2009/0095079 A1 | 4/2009 | Ayazi | 73/514.29 |
| 2009/0114016 A1 | 5/2009 | Nasiri et al. | 73/504.12 |
| 2009/0133498 A1 | 5/2009 | Lo et al. | 73/504.13 |
| 2009/0173157 A1 | 7/2009 | Stewart | 73/504.13 |
| 2009/0173158 A1 | 7/2009 | Gehring | 73/590 |
| 2009/0188317 A1 | 7/2009 | Aigner | 73/504.01 |
| 2009/0188318 A1* | 7/2009 | Zarabadi | G01C 19/5684 73/504.12 |
| 2009/0241662 A1 | 10/2009 | Supino et al. | 73/504.12 |
| 2009/0266162 A1 | 10/2009 | Ayazi et al. | 73/504.12 |
| 2009/0277271 A1 | 11/2009 | Seppa et al. | 73/627 |
| 2010/0058861 A1 | 3/2010 | Kuang et al. | 73/504.12 |
| 2010/0071465 A1* | 3/2010 | Stewart | G01C 19/5684 73/504.02 |
| 2010/0107761 A1 | 5/2010 | Ofri et al. | 73/504.13 |
| 2010/0148341 A1 | 6/2010 | Fuji et al. | 257/686 |
| 2010/0218606 A1 | 9/2010 | Fell | 73/504.13 |
| 2010/0263445 A1 | 10/2010 | Hayner et al. | 73/504.12 |
| 2010/0294039 A1 | 11/2010 | Geen | 73/504.12 |
| 2011/0023601 A1 | 2/2011 | Ikeda et al. | 73/504.13 |
| 2011/0048131 A1 | 3/2011 | Reinmuth | 73/504.12 |
| 2011/0192226 A1 | 8/2011 | Hayner et al. | 73/504.12 |
| 2011/0254599 A1 | 10/2011 | Dikshit et al. | 327/156 |
| 2012/0013774 A1 | 1/2012 | Kim et al. | 348/246 |
| 2012/0111112 A1 | 5/2012 | Sammoura et al. | 73/514.01 |
| 2012/0111113 A1 | 5/2012 | Sammoura et al. | 73/514.01 |
| 2012/0112765 A1 | 5/2012 | Sparks et al. | 324/633 |
| 2012/0137773 A1 | 6/2012 | Judy et al. | 73/504.12 |
| 2012/0137774 A1 | 6/2012 | Judy et al. | 73/504.12 |
| 2012/0195797 A1 | 8/2012 | Sparks et al. | 422/69 |
| 2012/0227487 A1 | 9/2012 | Ayazi et al. | 73/504.08 |
| 2013/0199294 A1 | 8/2013 | Townsend et al. | 73/504.13 |
| 2013/0319116 A1 | 12/2013 | Johari-Galle | 73/504.13 |
| 2015/0128701 A1 | 5/2015 | Vohra et al. | G01C 19/5698 |
| 2016/0153779 A1 | 6/2016 | Vohra et al. | G01C 19/5698 |

FOREIGN PATENT DOCUMENTS

| | | | |
|---|---|---|---|
| EP | 2 078 925 | 7/2009 | G01C 19/56 |
| EP | 2216904 | 8/2010 | H03H 9/25 |
| JP | 9116250 | 5/1997 | H05K 1/18 |
| JP | 2004 301734 | 10/2004 | G01C 19/56 |
| JP | 2008-64742 | 3/2008 | G01P 21/00 |
| JP | 2009-531707 | 9/2009 | G01C 19/56 |
| WO | WO 2007/061610 | 5/2007 | H01L 41/08 |
| WO | WO 2009/066640 | 5/2009 | H03H 9/25 |
| WO | WO 2011026100 A1 * | 3/2011 | G01C 19/5698 |

OTHER PUBLICATIONS

Ayazi, "Intergrated Solutions for Motion Sensing in Handheld Devices," Qualtré Inc., http://www.qualtre.com/motion-sensing-technology/, Oct. 2010, 3 pages.

Ayazi et al., "High Aspect-Ratio Combined Poly and Single-Crystal Silicon (HARPSS) MEMS Technology;" Journal of Microelectromechanical Systems, vol. 9, No. 3, Sep. 2000, 7 pages.

Ayazi et al., "Design and Fabrication of a High-Performance Polysilicon Vibrating Ring Gyroscope;" Center for Integrated Sen-

(56) References Cited

OTHER PUBLICATIONS sors and Circuits; Eleventh IEEE/ASME International Workshop on Micro Electro Mechanical Systems, Heidelberg, Germany, Jan. 25-29, 1998, 6 pages.
Ayazi et al., "A HARPSS Polysilicon Vibrating Ring Gyroscope;" Journal of Microelectromechanical Systems, vol. 10, No. 2, Jun. 2001, 11 pages.
Benes et al., "Comparison Between BAW and SAW Sensor Principles," *IEEE Transactions on Ultrasonics, Ferroelectrics and Frequency Control*, vol. 45 No. 5, Sep. 1998, pp. 1314-1330.
Bernstein, "An Overview of MEMS Inertial Sensing Technology," *Sensors*, http://www.sensorsmag.com/sensors/acceleration-vibration/an-overview-mems-inertial-sensing-technology-970 , Feb. 1, 2003, 6 pages.
Celikel et al., "Optoelectronic Design Parameters of Interferometric Fiber Optic Gyroscope with LiNbO3 Having North Finder Capability and Earth Rotation Rate Measurement," *Indian Journal of Pure & Applied Physics*, vol. 48, pp. 375-384, Jun. 2010, 10 pages.
Doe, "Qualtré Targets 3-Axis Gyro Market with Alternative Technology," *MEMS Trends*, Issue No. 3, pp. 8, Jul. 2010, 1 page.
Drafts, "Acoustic Wave Technology Sensors," Sensors (www.sensorsmag.com), 5 pages, Oct. 1, 2000.
Dubois, "Thin film bulk acoustic wave resonators: a technology overview," MEMSWAVE 03, Toulouse, France, 4 pages, Jul. 2-4, 2003.
Geen et al., New iMEMS® Angular-Rate-Sensing Gyroscope; ADI Micromachined Products Division; Analog Dialogue 37-3 (2003), 4 pages.
Johari, "Micromachined Capacitive Silicon Bulk Acoustic Wave Gyroscopes," A Dissertation Presented to the Academic Faculty in Partial Fulfillment of the Requirements for the Degree Doctor of Philosophy in the School of Mechanical Engineering Georgia Institute of Technology, Dec. 2008, 28 pages.
Johari et al., "High-Frequency Capacitive Disk Gyroscope in (100) and (111) Silicon," School of Electrical and Computer Engineering, Georgia Institute of Technology, MEMS 2007, pp. 47-50, Jan. 2007, 4 pages.
Johari et al., "Capacitive Bulk Wave Silicon Disk Gyroscopes," Electron Devices Meeting, 2006, Dec. 1, 2006, 4 pages.
Johnson, "Mechanical filters in electronics", John Wiley and Sons, 1983. ISBN: 0-471-08919-2 Chapter 3: Resonators and Coupling Elements, p. 83-97.
Johnson, "Qualtre Preps Solid State MEMS Gyros," *MEMS Investor Journal*, http://www.memsinvestorjournal.com/2010/04/qualtre-preps-solidstate-mems-gyros.html_, Apr. 8, 2010, 2 pages.
Link, "Angular Rate Detector DAVED®-RR," Application Report SE 090.2; Institute of Micromachining and Information Technology, 1 page, Dec. 11, 2007, http://hsgimit.de/fileadmin/gfx/pdfs/AnwendungsberichtSE090_2rr_englisch_V1.pdf.
Link, "Angular Rate Detector DAVED®-LL," Application Report SE 100.1; Institute of Micromachining and Information Technology, 1 page, Dec. 11, 2007,hsg-imit.de/fileadmin/gfx/pdfs/anwendungsberichtse100_1ll_englisch01.pdf.
Nasiri, "A Critical Review of MEMS Gyroscopes Technology and Commercialization Status," InvenSense, 8 pages, 2005, www.scantec.de/uploads/mdia/MEMSGyroComp_02.pdf.
Ramirez, "PZE Energy Harvester," *45 RF MEMS Based Circuit Design—conocimeintos.com.ve*, http://conocimientosrfmemsdesign.blogspot.com/2010/07/pze-energy-harvester.html , Jul. 24, 2010, 4 pages.
Satrom et al., "Disc Resonating Gyroscopes: A Summary of a Recent Development in MEMS Technology," Northwestern University, http://www.google.com/url?sa=t&rct=j&q=&esrc=sfrm=1&source=web&cd=1&sqi=2&ved=0CCQQFjAA&url=http%3A%2F%2Fclifton.mech.northwestern.edu%2F~me381%2Fproject%2F06fall%2FFruthSatrom.pdf&ei=ZOsyT6D3IMjMrQfE6qSnDA&usg=AFQjCNFXOj00sAsF6bMdfEV70D7JzzLkBw&sig2=jwpU1Tgot45sT_fgi8lzMw, Dec. 1, 2006, 15 pages.
Saukoski, "System and Circuit Design for a Capacitive MEMS Gyroscope," Doctoral Dissertation, TKK Dissertations 116, Helsinki University of Technology, 279 pages. (2008).
Yang et al., "An electro-thermal bimorph-based microactuator for precise track-positioning of optical disk drives;" J. Micromech. Microeng., v. 15 (2005) 958-965 Journal of Micromechanics and Microengineering.
Park et al., "Oscillation Control Algorithms for Resonant Sensors with Applications to Vibratory Gyroscopes," *Sensors*, vol. 9, pp. 5952-5967 (2009).
Senkal et al., "100K Q-Factor Toroidal Ring Gyroscope Implemented in Wafer-Level Epitaxial Silicon Encapsulation Process," *2014 IEEE 27th International Conference on Micro Electro Mechanical Systems (MEMS)*, pp. 24-27 (2014).
Sonmezoglu et al., "Simultaneous Detection of Linear and Coriolis Accelerations on a Mode-Matched MEMS Gyroscope," *2014 IEEE 27th International Conference on Micro Electro Mechanical Systems (MEMS)*, pp. 32-35 (2014).
Challoner et al., Boeing Disc Resonator Gyroscope. Attitude Controls Systems, Flight Engineering, Boeing Company. IEEE. 2014; pp. 504-511.

\* cited by examiner

RING GYROSCOPE STRUCTURAL FEATURES

TECHNICAL FIELD

Various embodiments of the invention generally relate to inertial sensors and, more particularly, various embodiments of the invention relate to ring gyroscopes.

BACKGROUND ART

Vibrating ring gyroscopes, developed over the course of the past two decades, have typically employed solid rings cantilevered centrally relative to a substrate by means of an anchor. A single annulus suspended by a compliant support structure will oscillate in a desired mode with nearly equal displacement of both the inner and outer edges of the ring.

Composite rings coupled to contiguous radial beams that extend outward from a central support have also been designed. Additional degrees of freedom are sought, however, to expand the space of design parameters, thereby allowing for optimizing sensitivity to particular modes of vibration.

SUMMARY OF EMBODIMENTS OF THE INVENTION

In accordance with an embodiment of the present invention, a resonator is provided that has a plurality of rings forming a composite ring, the plurality of rings disposed concentrically with respect to an axis. Each of the plurality of rings is coupled to a neighboring ring by a plurality of coupling beams, each of which is oriented substantially radially with respect to the axis. The resonator has a compliant support structure adapted to suspend the plurality of rings relative to a substrate, and at least one actuator configured to drive the plurality of rings in a plurality of coupled oscillatory modes.

In accordance with alternate embodiments of the invention, the annular widths of the plurality of rings may increase monotonically with radius. At least one of the plurality of coupling beams may be stiff, in the sense defined below, or, in some embodiments, all of the coupling beams may be stiff. The plurality of coupling beams between any one of the plurality of rings and a neighboring ring may be spaced at equal spacing angles around the axis of the rings, and the spacing angles may be the same between each of the plurality of rings of the composite ring and its neighboring ring, or else vary between rings of the plurality of rings as a function of radius of the rings.

In accordance with other embodiments of the present invention, the compliant support structure may include a lattice of concentric rings and radial members. It may be coupled to a substrate via an anchor interior to all of the concentric rings. The resonator may also have at least one sensing electrode for sensing vibration amplitude of one of the plurality of concentric rings.

In further embodiments of the invention, a first sensing electrode may be disposed at an inner edge of the composite ring and a second sensing electrode may be disposed at an outer edge of the composite ring. At least one sensing electrode may be disposed at a locus characterized by a local maximum displacement less than an overall maximum transverse displacement of the composite ring.

In yet further embodiments of the invention, the annular width of each of the plurality of rings of the composite ring may vary as a specified function of the radius of the ring. Each of the plurality of rings which together constitute the composite ring may be characterized by a substantially identical resonance frequency.

In other embodiments of the invention, the compliant support structure may be adapted to suspend the plurality of rings relative to a substrate at a radius larger than any of the plurality of rings. The compliant support structure may have an inner edge coupled to the composite ring and an outer edge coupled to an outside anchor. At least one sensor may be disposed at a radius from the central axis that is smaller than that of any of the plurality of rings of the composite ring, and at least one sensor may be disposed at a radius from the axis larger than that of any of the plurality of rings of the composite ring.

In accordance with a further aspect of the present invention, a ring gyroscope is provided that has an annular composite ring proof mass characterized by an inner side and an outer side, and a compliant support structure for supporting the annular composite ring. A plurality of drive electrodes are disposed at a first of the inner side and the outer side, while a plurality of sense electrodes is disposed at a second of the inner side and the outer side, the first and second sides being distinct. Each drive electrode is a member of a triplet of drive electrodes, and each triplet of electrodes has an inner segment for applying either an AC forcing signal or a tuning voltage, and; and two outer segments straddling the inner segment for applying the other of the AC forcing signal and the tuning voltage.

In accordance with yet another aspect of the present invention, a ring gyroscope is provided that has an annular composite ring proof mass characterized by an inner side and an outer side with respect to a central axis. The ring gyroscope also has a compliant support structure for supporting the proof mass, and a plurality of electrodes, each of the electrodes serving for at least one of driving, sensing and tuning one or more vibrational modes of the proof mass, with each of the plurality of electrodes disposed at one of the inner side and the outer side of the proof mass. Finally, the ring gyroscope has a first shock stop disposed between a first pair of the electrodes, the first shock stop extending in a radial direction toward the proof mass, such that displacement of the proof mass in a radial direction results in contact with a shock stop prior to contact with any electrode.

In other embodiments of the invention, the ring gyroscope may also have a second shock stop disposed between a second pair of the electrodes, wherein at least one electrode of the first pair of electrodes is distinct from one electrode of the second pair of electrodes. The first and second shock stops may be coupled via a structural member.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Definitions

The term "set," as used herein, shall not include the empty set, and shall refer to any counting number $\{c \subset \mathbb{C}\}$ of specified elements, including one.

The term "plurality," as used herein, shall mean "two or more."

A "difference" between two signals shall refer to a linear combination of the amplitudes of two signals whereby the combination includes components of the respective signal amplitudes which are out of phase with each other. Thus, for example, the signals may undergo common, or differential, amplification or attenuation, prior to combination out of phase. Similarly, the verb "difference" shall refer to generating a difference between two signals as previously defined.

An "electrode" shall refer to any transducer which provides a signal that is related in a known way to a sensed quantity. Thus, an electrode may sense electrostatically, or capacitively, or magnetically, for example, or using any sensing modality, to generate a signal.

The term "opposing," as referring to electrodes disposed with respect to a resonator mass having cylindrical symmetry, shall denote that the electrodes are disposed substantially along a line that is perpendicular to the axis of cylindrical symmetry of the resonator mass.

"Orthogonal pairs" of electrodes, as referring to electrodes disposed with respect to a resonator mass having cylindrical symmetry, shall denote pairs of electrodes disposed along substantially perpendicular directions, which is to say, along orthogonal linear acceleration axes, in a plane transverse to the axis of cylindrical symmetry of the resonator mass.

The term "about," used in the sense of electrodes disposed about a ring, shall refer, without limitation, to placement on opposite sides of a plane containing the axis of cylindrical symmetry of the ring. The term is not specific as to the placement of electrodes inside, outside, above, or below, the ring.

A "ring resonator" shall refer to a structure of cylindrical symmetry, of which a resonant frequency pertinent to the sensing application described herein is predominantly governed by the stiffness of the ring rather than by the stiffness of the support of the ring relative to a supporting structure.

A "composite ring" shall refer to a set of coaxial rings coupled by a plurality of transverse members.

A resonator element or structure shall be referred to herein as "compliant" when it bends in a mode used for gyroscopic sensing without its stiffness affecting the mode frequency of a pertinent resonator mass to a degree exceeding approximately 15%.

A mechanical element or structure shall be referred to herein as "stiff" when its stiffness determines a frequency of a specified vibrational mode.

A mechanical element or structure may be referred to herein as "semi-compliant" when it bends in a mode used for gyroscopic sensing without its stiffness affecting the mode frequency of a pertinent resonator mass to a degree between 15% and 50%.

Figure 1:
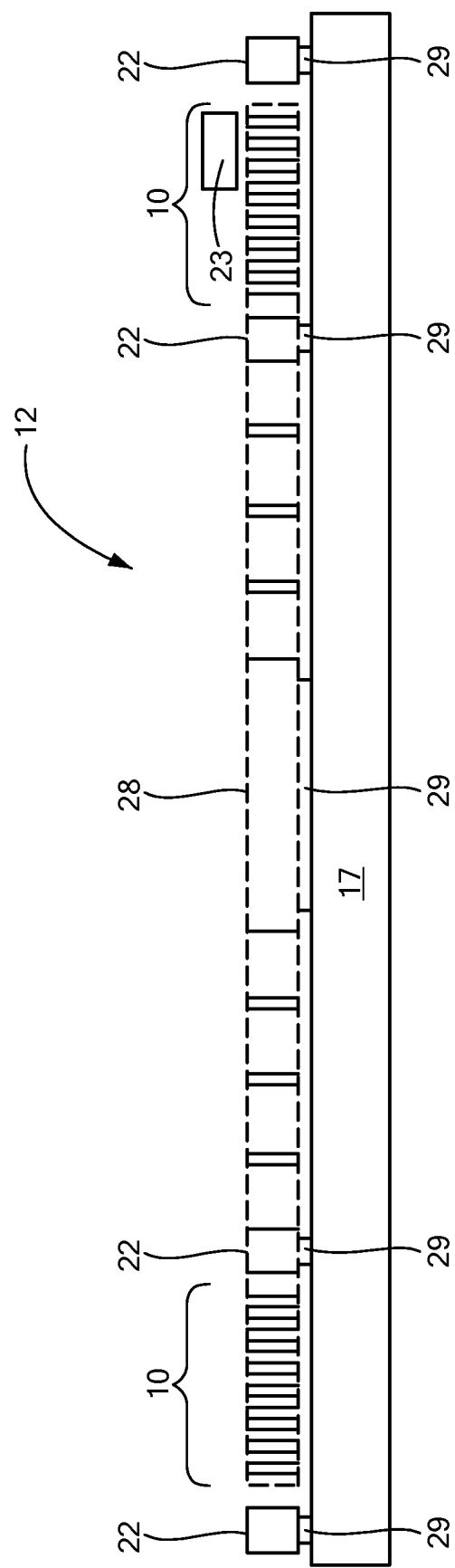
FIG. 1 schematically depicts a cross-sectional view of a MEMS ring resonator that may be configured to detect both rotation and linear acceleration in accordance with embodiments of the present invention.

FIG. 1 is provided to show salient parts of a MEMS resonator, designated generally by numeral 12, which is a ring resonator in the depicted embodiment. Teachings in accordance with the present invention may be applied to various geometries of a MEMS resonator, and a ring resonator is depicted by way of example only.

The present description may use orientational terms such as "top," "bottom," and the like, for descriptive convenience only, though it is to be understood that the orientation in space of the presently described apparatus is of no relevance to the invention as claimed. Those terms are used with respect to the frame of reference of FIG. 1.

Resonator 12 is a one, two, or three dimensional inertial sensor that measures rotational movement about one or more of the X, Y or Z axes, where the X axis is into the page in FIG. 1, the Y axis is horizontal, and the Z axis is vertical. Resonator 12, in accordance with the present invention, may also measure linear motion with respect to one or more of the three orthogonal axes of linear motion. Accordingly, those skilled in the art refer to this type of resonator as either or all of a Z gyroscope, an X/Y gyroscope, a two dimensional gyroscope, a one, two, or three axis accelerometer, and/or a combination accelerometer and gyroscope. It nevertheless should be reiterated that illustrative embodiments apply to inertial sensors that measure rotation about a subset of orthogonal linear axes, such as the Z-axis alone, about the X-axis and Z-axis, or about all three axes, among the various combinations. Accordingly, discussion of the specific resonator 12 depicted in FIG. 1 is not to limit various embodiments of the invention.

As noted above, the resonator 12 can act as a gyroscope and/or as an accelerometer. The gyroscopic function is discussed first, immediately below. At its core, MEMS resonator 12 has a sensor mass 10, which, in the embodiment of FIG. 1, assumes the shape of a composite ring comprised of a plurality of substantially concentric subrings 15. Sensor mass 10 may henceforth be referred to herein as a ring 10, without loss of generality. Ring 10 can resonate in one of the known types of vibrational modes upon receipt of an appropriate electrostatic actuation signal. The vibrational mode for detecting rotational movement in the embodiment shown is typically an elliptical mode, however it can be any of a variety of different modes, either in-plane or out-of-plane, within the scope of the present invention.

One or more electrodes 22 (discussed below) produce an electrostatic force that causes portions of ring 10 to vibrate relative to a substrate 17 during both actuation and detection phases. The ring 10 is configured to vibrate in a predetermined manner at the known vibration frequency. For example, the vibration frequency may be the resonant frequency of the ring 10. Specifically, parts of the ring 10 may vibrate, while other parts of the ring 10 may remain substantially stable—so-called "nodes" of the vibration.

Rotation about the Z-axis causes coupling of some energy from a first vibrational mode of ring 10, at which the ring is driven, into a second, and orthogonal, vibrational mode of the ring, by virtue of Coriolis forces. The vibrational modes are orthogonal in the sense that they correspond to orthogonal eigenmodes of the system. By sensing the amplitude of vibration in the second mode, with one or more rate-sense electrodes, the rate of rotation may be measured.

Off-chip circuitry or on-chip circuitry thus detects a capacitance change (for example) as a changing signal, which includes the necessary information for identifying the degree and type of rotation. The larger system then can take appropriate action, such as controlling the rotation of tires in an automobile for stabilization control, for example.

Ring 10 should be supported to function most effectively. To that end, ring 10 is mechanically coupled via support beams 26 and 28 to at least one of anchors 29. Ring 10 may be made by depositing a polysilicon layer on substrate 17 with a sacrificial oxide layer that has been processed to form holes where anchors 29 will be formed. The polysilicon layer fills the holes to form anchors 29. The polysilicon is shaped with standard processing to form electrodes 22, support beams 26 and 28, and subrings 15 of ring 10. The sacrificial oxide layer is then removed using standard processing steps. Electrical connections to the ring and electrodes may be provided using any methods known in the art, including directly bonding to the anchored areas with bond wires, adding additional routing layers to the process, or using vias through the substrate 17 directly to attached circuitry.

Figure 2A:
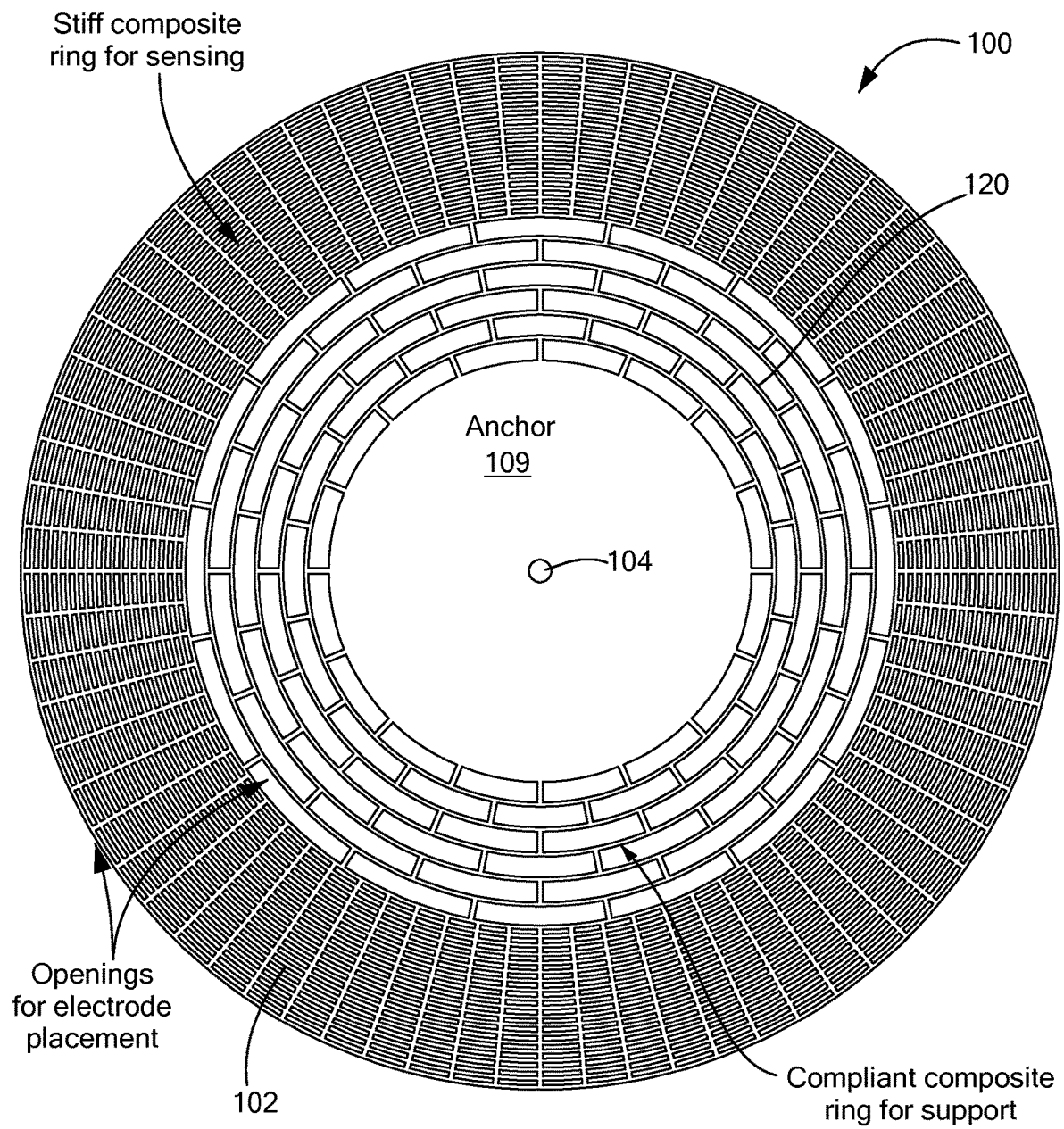
FIG. 2A schematically depicts a cross-sectional view from the top of a composite ring for a gyroscope with a compliant composite support, in accordance with an embodiment of the present invention.
Figure 2B:
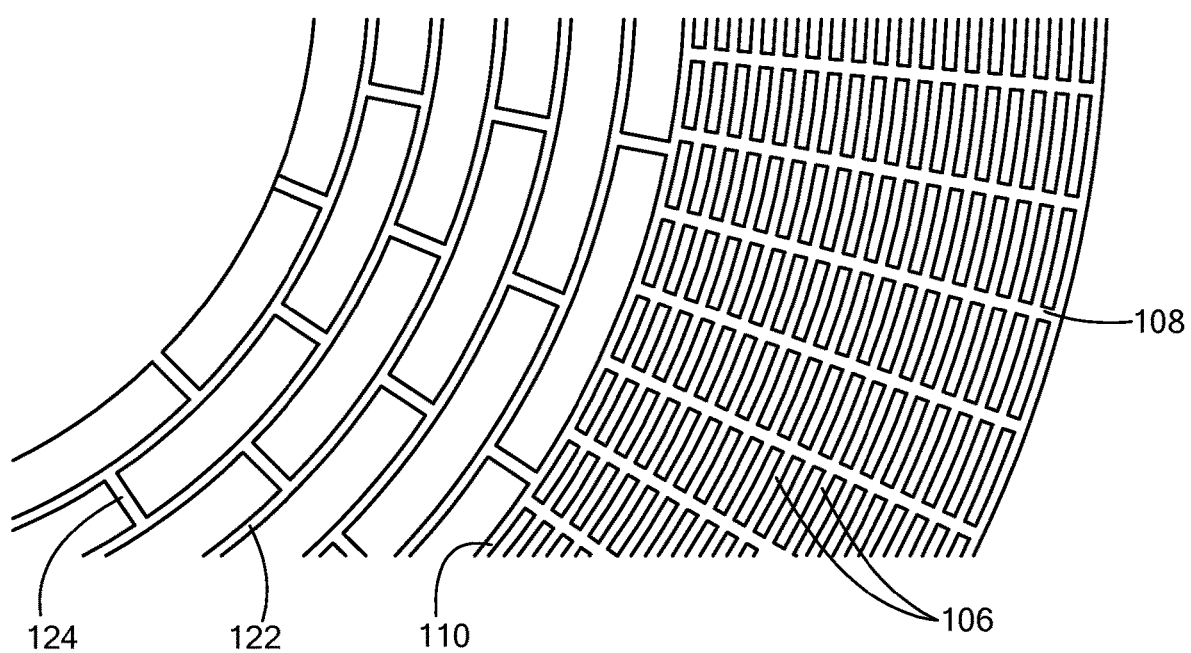
FIG. 2B is an enlarged view of a portion the composite ring of FIG. 2A.

In various embodiments of inertial sensors, described now with reference to FIGS. 2A and 2B, a sensor mass (also referred to, herein, as a "proof mass") for an inertial sensor (designated generally by numeral 100) that employs microelectromechanical systems (MEMS) technology may assume the shape of a disk, or of an annular ring (or "ring") 102, with axis 104 representing the axis of cylindrical symmetry for a sensor mass shaped as a ring. As used herein, the term "radial" is with respect to axis 104 of cylindrical symmetry. The general tenets of MEMS inertial sensor technology are assumed to be known to the reader, who is referred to co-pending U.S. patent application Ser. No. 14/080,370 (Vohra and Geen) for examples of a an inertial sensor for sensing linear and rotational movement. Placement of sensor electrodes, for sensing the amplitude of vibration in various modes of vibration of a sensor mass and for generating electrical signals from which linear acceleration and rotation may be derived, is described therein. Ring 102 may be referred to herein, and in any appended claims, as a "resonator."

A sensor mass (such as ring 102, for example) may be characterized by its fundamental resonant frequency, which is proportional to the square root of the ratio of its stiffness to its mass. The resonant frequency of ring 102 will be different when the sensor mass is coupled to a support. A ring obtains the predominant part of its stiffness from the annulus itself, as opposed to its coupling to a support.

Ring 102, as shown in the embodiment of FIG. 2A, is a "composite ring," which, as defined above, refers to the fact that ring 102 is composed of multiple substantially concentric subrings 106. Subrings 106 are each characterized by a width, and the widths of the subrings may be identical, or they may vary radially from subring to subring. Subrings 106 are held together with respect to one another by transverse members 108 which couple each subring 106 to at least one adjacent subring. A transverse member 108 may span all of the subrings 106, or may alternate from subring to subring, as is the case in the embodiment of FIGS. 2A and 2B, however neither configuration need be the case in other embodiments of the invention. Transverse members 108 may be substantially radial with respect to axis 104 of cylindrical symmetry, however, again, that need not be the case, within the scope of the present invention.

Transverse members 108 serve to couple the subrings 106 into a composite ring 102 that is "stiff," as defined above. The innermost subring 110 is coupled, in turn, to a further composite ring, more particularly, a compliant composite ring 120 that serves as a compliant support structure. Compliant composite ring 120 serves to suspend the composite ring 102, and, by extension, its subrings 106, with respect to a supporting substrate (not shown), whether via an anchor 109, or otherwise. Compliant composite ring 120 is made up of substantially concentric subrings 122, each coupled to one or more neighboring subrings by transverse coupling beams 124. Coupling beams 124 between any two adjacent subrings may be spaced equally, which is to say that they are spaced at some integral submultiple of 360°. The angle between two adjacent coupling beams may be referred to as a "spacing angle." The spacing angles of coupling beams may be the same for coupling to either side of any one subring, or else the spacing angles may vary as a function of ring radius, or otherwise. Moreover, the coupling beams that couple one subring to a subring of larger radius may be offset in angle relative to the coupling beams that couple the same subring to a subring of smaller radius. The compliant composite ring 120 may be designed similarly to the stiff composite ring 102 but with thinner component subrings, more widely spaced transverse coupling members, or with couplers of alternating spacing, so as to create a structure having a desired low compliance with respect to the operating mode of the gyroscope. Drive and sense electrodes may be placed at outer edge 125 and/or at inner edge 127 of composite ring 102. The structure of rings and coupling beams may be referred to herein as a "lattice," without implying that the spacings are regular.

Figure 3:
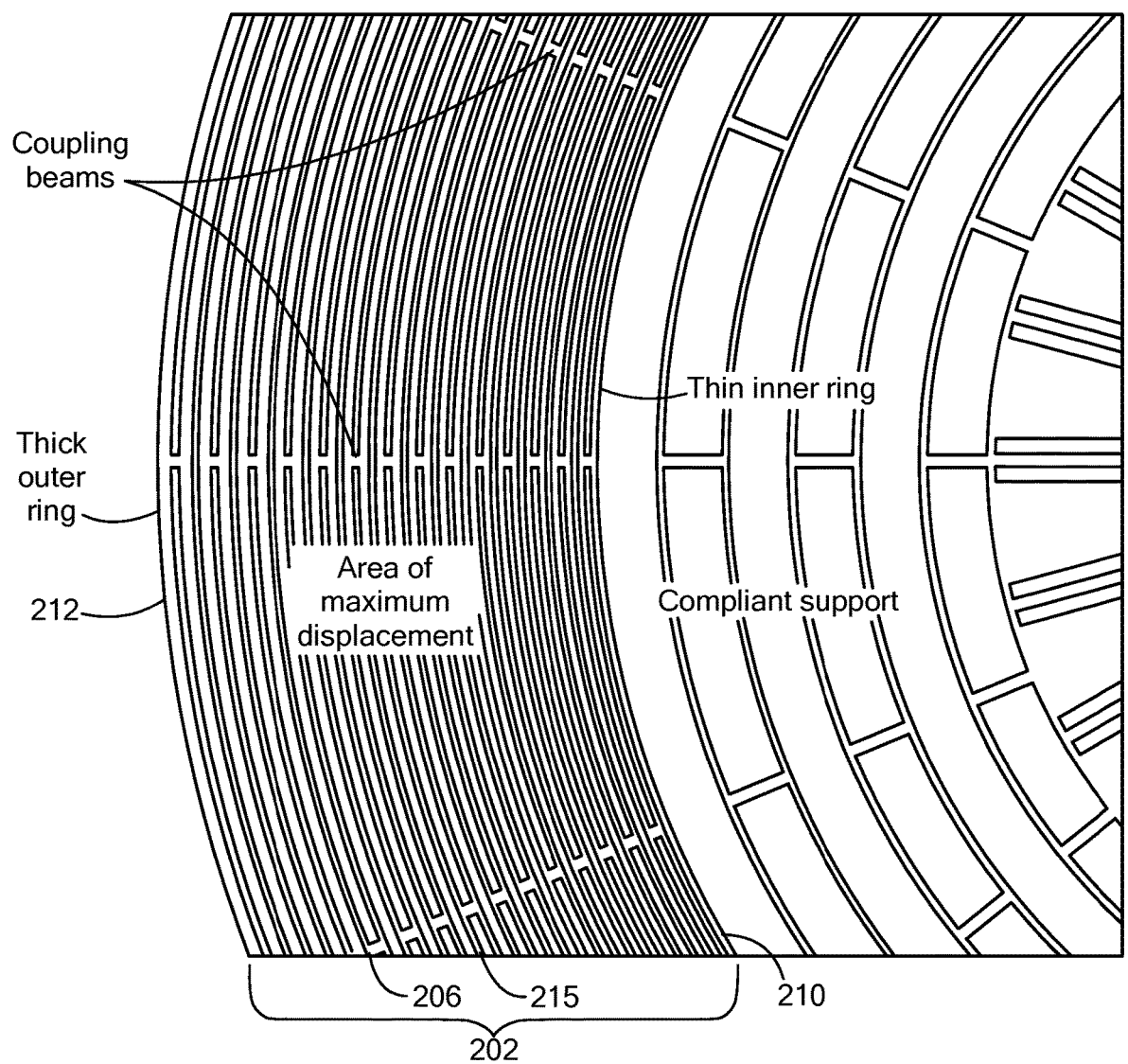
FIG. 3 schematically depicts a cross-sectional view from the top of a composite ring for a gyroscope with a compliant composite support, in accordance with an embodiment of the present invention.

If a composite ring 102 is considered as a composite of many rings 106 connected with coupling beams 108, it is possible to optimize the width of the rings to control the relative displacement of the inner rings, middle rings, and outer rings. One example of this optimization results in composite ring 202, now described with reference to FIG. 3. Subrings 206 of composite ring 202 may vary as a specified function of the radii of respective rings, and, in the embodiment shown, subrings 206 are of ascending ring width, where the width of each ring going radially outward from the center is of increasing width such that the resonance frequency of each ring considered on its own is equal to the resonance frequency of all of the other rings. The composite ring 202 structured as described, has a mode shape where the inner 210 and outer 212 rings have equal displacement amplitudes and the middle rings 215 have larger displacement amplitudes. This mode shape has an increase in the total oscillation energy for comparable displacement at the sense and drive electrodes of a homogenous ring. Higher mode energy is understood to result in an improved signal to noise ratio. Limiting the displacement at the sense and drive electrodes reduces non-linearity in the operation of the oscillating ring as a gyroscope.

Figure 4:
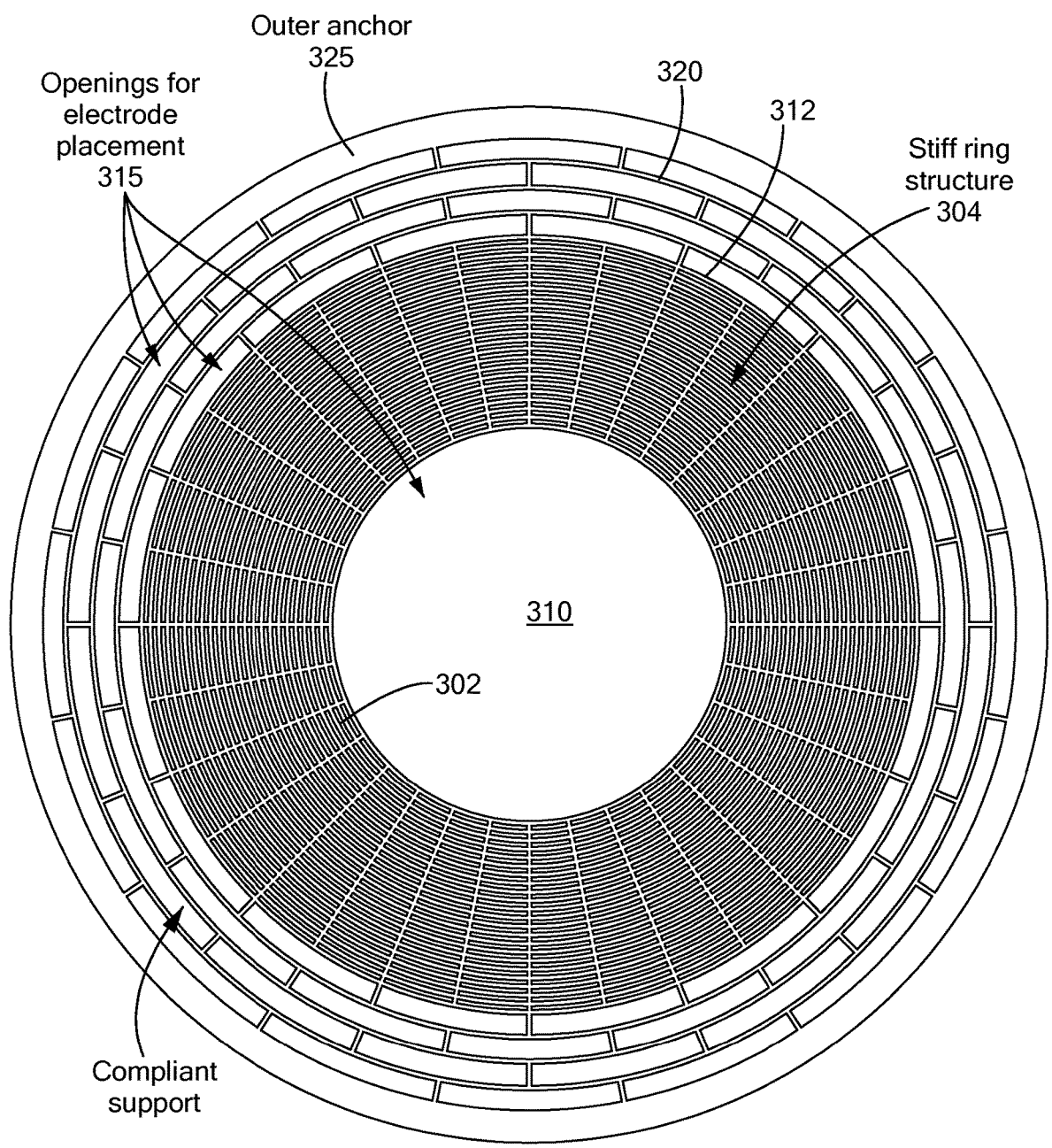
FIG. 4 schematically depicts a cross-sectional view from the top of a composite ring for a gyroscope with a compliant composite support coupling the composite ring to an anchor distal to the composite ring relative to a central axis, in accordance with an embodiment of the present invention.
Figure 5:
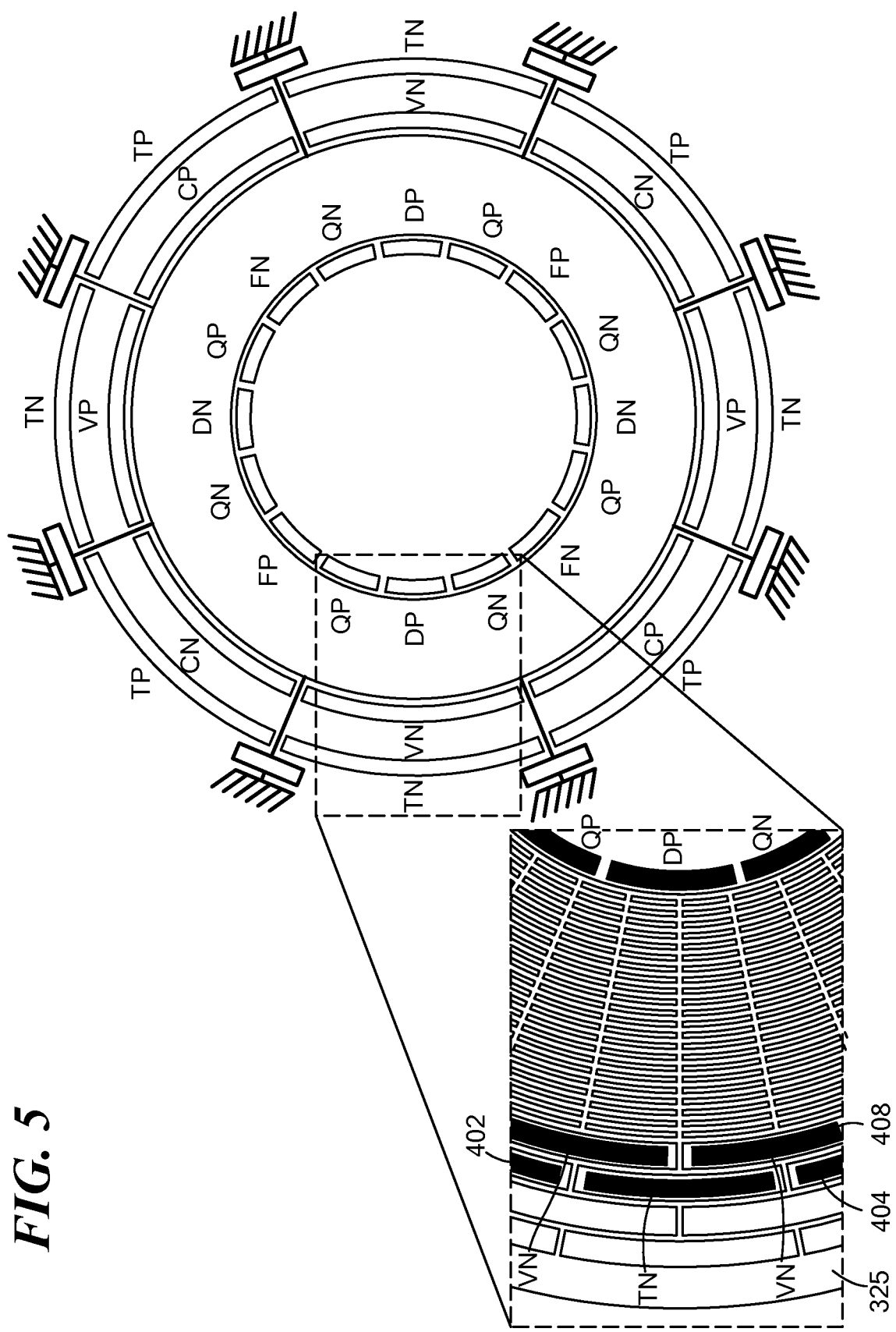
FIG. 5 schematically depicts placement of drive and sense electrodes relative to a ring with a compliant exterior support, in accordance with an embodiment of the present invention.

Further embodiments of the present invention are now described with reference to FIG. 4 wherein sensor mass 302 is anchored to a support structure, not by a central anchor, but by a compliant support 320 coupled to an outer anchor 325 disposed peripherally to the sensor mass. Sensor mass 302 may be a composite ring, as described above, or may be another resonant structure within the scope of the present invention. The compliant support 320 may have any of the structural characteristics described with respect to the interior compliant support of the embodiment shown in FIG. 3. Oscillation of sensor mass 302 may be sensed and driven in a central opening 310, and/or at outer edge 312 of sensor mass 302, and/or at openings 315 in compliant support 320. By suitable design, oscillation of sensor mass 302 may be concentrated in part of the disk adjacent to the opening where sense electrodes are positioned. In accordance with alternate embodiments of the invention now described with reference to FIG. 5, a compliant support 320 may be provided between the outer anchor 325 and a stiff ring 402 inside the anchor area. Adding compliant support 320 allows the stiff ring 402 to oscillate with roughly equal displacement at the inner and outer edges which increases the oscillation energy and allows for the placement of electrodes 404, 408 at both edges. Placing electrodes 404, 408 at both edges may advantageously improve the signal levels, trim range (to account for fabrication variation), and rejection of environmental effects.

Figure 6:
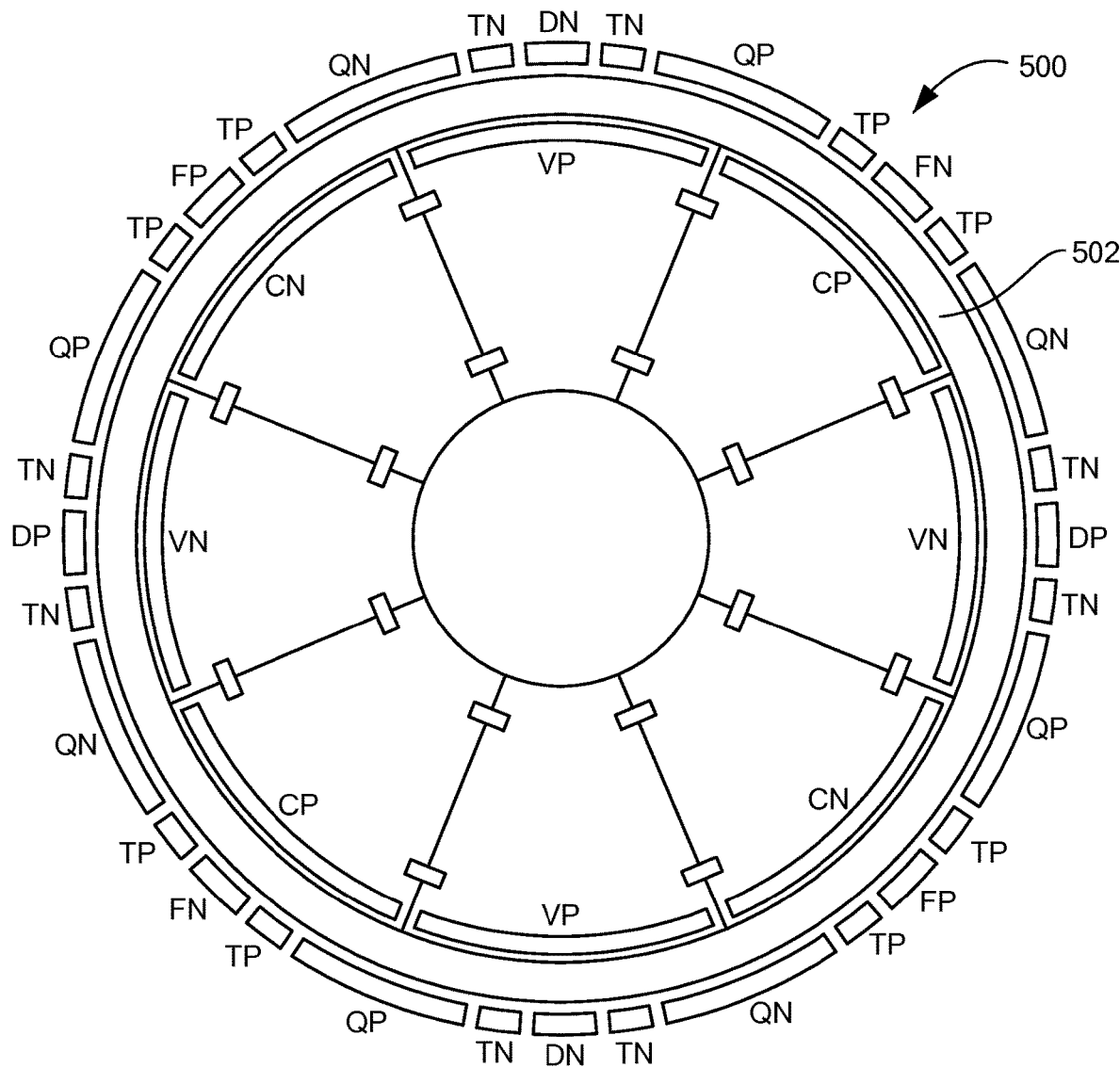
FIG. 6 schematically depicts placement of drive and sense electrodes for reduced vibration and temperature sensitivity, in accordance with an embodiment of the present invention.

Referring now to FIG. 6, an embodiment of an inertial sensor (designated generally by numeral 500) is shown in which a resonant sensor mass is represented as a ring 502. It is to be understood, however, that other geometries may also be employed within the scope of the invention. Ring 502 may also be a composite ring, such as described above with reference to preceding figures. FIG. 6 schematically depicts support of ring 502 relative to a central anchor, however the particular sensor geometry depicted is shown solely by way of example. In general terms, FIG. 6 depicts a preferred configuration of electrodes that may advantageously reduce sensitivity of inertial sensor 500 to such influences as sensor vibration and temperature variation. In accordance with one embodiment of the invention, drive electrodes DN and DP are placed at anti-nodes (azimuth angles of maximum vibratory displacement amplitude) of ring 502 (in oscillatory modes of interest for gyroscope operation). Where the placement of certain electrodes is shown at the exterior of ring 502 and other electrodes are shown at the interior of ring 502, it is to be understood that such placement is shown by way of example, and without limitation.

Force-feedback electrodes FN and FP are placed at nodes (azimuth angles of minimum or zero vibratory displacement amplitude) of ring 502.

In accordance with embodiments of the invention, quadrature tuning electrodes QP and QN are placed between the drive and force-feedback electrodes. Each drive or force-feedback electrode cluster is broken into 3 parts. The middle section is used to apply AC forcing signals to the ring. The outer two sections are connected electrically and used to apply tuning voltages. It is to be understood that, alternatively, the voltages applied to the inner and outer sections may be reversed. The relative size of the drive portion to the tuning portion may be adjusted based on the available driving force and tuning force. For a gyroscope with high quality factor (Q), the driven electrode may be made very small compared to the tuning electrodes.

Figure 7:
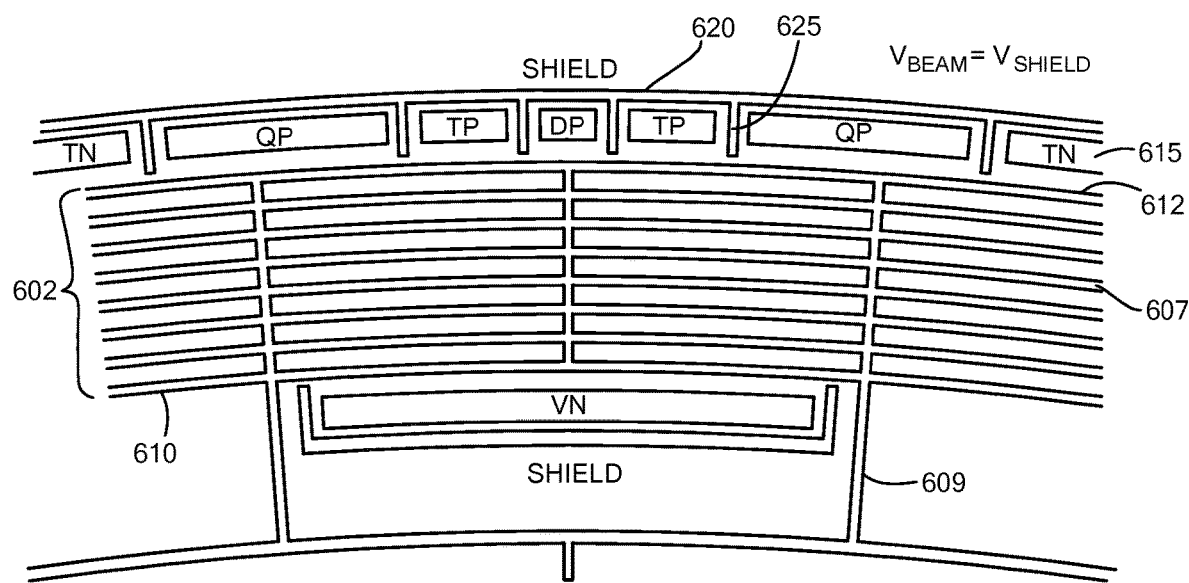
FIG. 7 is a schematic wedge view, of a cross section parallel to the top, of a ring gyroscopic sensor, showing inner and outer edges of an annular ring test mass relative to groups of electrodes, and depicting shock stops, in accordance with an embodiment of the present invention.

Referring now to FIG. 7, a resonant beam 602 (in this case, a composite ring of concentric subrings 607 and transverse coupling members 609), as described above, is shown as an example of a resonant test mass, shown, in part, in cross section from above, relative to a central axis of symmetry 604. While the exemplary structure shown is that of an annular composite ring, the scope of the present invention is not so limited. Inner edge 610 and outer edge 612 are indicated in particular.

Various drive and sense electrodes 615, used for driving, interrogating and tuning the various modes of oscillation of resonant beam 602, are shown: TN (drive frequency tuning), TP (Coriolis mode frequency tuning), QP (quadrature tuning), DP (drive force) and VN (velocity sense) electrodes are shown, however the placement of these electrodes is indicated by way of example only, and without limitation. The spacing between an electrode and the nearest point on resonant beam 602 is referred to herein as an "electrode gap."

In typical operation, a large voltage potential is maintained between the electrodes 615 and the vibrating structure. Shock conditions may result in motion of resonant beam 602 such that it will make contact with one or more of the electrodes 615, thereby causing a short. There are several advantages to fabricating the gyroscope with the electrode gaps larger than a minimum gap that would still support the potential difference between the resonant beam 602 and the electrode. These advantages include higher shock tolerance and increased operating amplitude, for example.

In accordance with embodiments of the present invention, shock stops 625, typically coupled to an outer shield 620, extend radially inward toward resonant beam 602, not touching beam 602 but maintaining a minimum gap under ordinary operating conditions. Shock stops 625 straddle each of the electrodes 615, such that, in case of a shock, the vibrating mass will contact the stops before the electrodes. For very large shocks, the vibrating structure may deform around the stops 625 and make contact with the electrode 615. This can still cause an electrical short, but at a much higher level of shock than would be the case without the stops 625, and recovery from the shock will be improved since the contact area will be reduced, making it easier for the vibrating structure to disengage from the electrode.

The shock stops 625 are preferably at the same electrical potential as that of outer shield 620 and that of the vibrating structure. In accordance with various embodiments of the present invention, the shock stops 625 may be coupled to each other, as by braces outside the plane of the page in FIG. 7, and may all be coupled to a ring extending around the periphery of the sensor, for example, for maximum strength.

While exemplary embodiments of the invention are described with reference to a MEMS device that is a ring resonator, it should be noted that the various teachings of the present invention are general and are not limited to ring or to disk gyroscopes. Rather, embodiments of the present invention can apply more generally to other types of MEMS devices having resonating elements of other shapes.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A micro-scale gyroscope resonator comprising:
   a composite ring comprising a first plurality of rings lying substantially in a plane and including at least a first ring having a first inner diameter and a first outer diameter, a second ring having a second inner diameter and a second outer diameter and a third ring having a third inner diameter and a third outer diameter, the composite ring being configured to exhibit an oscillation mode whereby an outermost ring of the first plurality of rings and an innermost ring of the first plurality of rings have substantially equal displacement amplitudes, wherein:

the first inner diameter is different from the second inner diameter and the third inner diameter, a difference between the first outer diameter and the first inner diameter is different from a difference between the second outer diameter and the second inner diameter, the difference between the first outer diameter and the first inner diameter is different from a difference between the third outer diameter and the third inner diameter, and the difference between the second outer diameter and the second inner diameter is different from the difference between the third outer diameter and the third inner diameter;

a first electrode positioned inside the composite ring and a second electrode positioned outside the composite ring; and a compliant support structure adapted to suspend the first plurality of rings relative to a substrate.

2. A micro-scale gyroscope resonator according to claim 1, wherein the first inner diameter is greater than the second inner diameter and the second inner diameter is greater than the third inner diameter, the difference between the first outer diameter and the first inner diameter is greater than the difference between the second outer diameter and the second inner diameter, and the difference between the second outer diameter and the second inner diameter is greater than the difference between the third outer diameter and the third inner diameter.

3. A micro-scale gyroscope resonator according to claim 1, wherein the oscillation mode is such that the first plurality of rings produce a same amount of displacement.

4. A micro-scale gyroscope resonator according to claim 1, wherein the first plurality of rings are concentric.

5. A micro-scale gyroscope resonator according to claim 1, wherein the first plurality of rings are coupled to one another via a plurality of coupling beams.

6. A micro-scale gyroscope resonator according to claim 1, further comprising at least one actuator positioned in correspondence with an anti-node of the composite ring.

7. A micro-scale gyroscope resonator according to claim 1, wherein the compliant support structure comprises a second plurality of rings including at least a fourth ring, a fifth ring and a sixth ring, wherein the fourth ring is coupled to the fifth ring only via a first plurality of coupling beams and the fifth ring is coupled to the sixth ring only via a second plurality of coupling beams, the first plurality of coupling beams being angularly offset relative to the second plurality of coupling beams.

8. A micro-scale gyroscope resonator according to claim 7, wherein at least one of the first plurality of coupling beams is stiff.

9. A micro-scale gyroscope resonator according to claim 7, wherein all of the first plurality of coupling beams are stiff.

10. A micro-scale gyroscope resonator according to claim 7, wherein the first plurality of coupling beams are spaced from one another at equal spacing angles.

11. A micro-scale gyroscope resonator according to claim 7, wherein the second plurality of rings are concentric.

12. A micro-scale gyroscope resonator according to claim 7, wherein the first plurality of coupling beams have first ends adjacent the fourth ring and second ends adjacent the fifth ring, and wherein the second plurality of coupling beams have first ends adjacent the fifth ring and second ends adjacent the sixth ring.

13. A micro-scale gyroscope resonator according to claim 1, wherein the compliant support structure is coupled to the substrate via an anchor interior to all of the first plurality of rings.

14. A micro-scale gyroscope resonator according to claim 1, wherein the first electrode is a drive electrode and the second electrode is a sense electrode.

15. A micro-scale gyroscope resonator comprising:

a composite ring comprising a first plurality of rings lying substantially in a plane and including at least a first ring having a first inner diameter, a first outer diameter and a first annular width, a second ring having a second inner diameter, a second outer diameter and a second annular width and a third ring having a third inner diameter, a third outer diameter and a third annular width;

a first electrode positioned inside the composite ring and a second electrode positioned outside the composite ring; and a compliant support structure adapted to suspend the first plurality of rings relative to a substrate, wherein the first inner diameter is greater than the second inner diameter and the second inner diameter is greater than the third inner diameter, and wherein the first annular width is greater than the second annular width and the second annular width is greater than the third annular width, and wherein the composite ring is configured to exhibit an oscillation mode whereby an outermost ring of the first plurality of rings and an innermost ring of the first plurality of rings have substantially equal displacement amplitudes.

16. A micro-scale gyroscope resonator according to claim 15, wherein the oscillation mode is such that the first plurality of rings produce a same amount of displacement.

17. A micro-scale gyroscope resonator according to claim 15, wherein the compliant support structure comprises a second plurality of rings including at least a fourth ring, a fifth ring and a sixth ring.

18. A micro-scale gyroscope resonator according to claim 17, wherein the fourth ring is coupled to the fifth ring only via a first plurality of coupling beams and the fifth ring is coupled to the sixth ring only via a second plurality of coupling beams, the first plurality of coupling beams being angularly offset relative to the second plurality of coupling beams.

19. A micro-scale gyroscope resonator according to claim 18, wherein the first plurality of coupling beams are spaced from one another at equal spacing angles.

20. A micro-scale gyroscope resonator according to claim 15, wherein the compliant support structure is coupled to the substrate via an anchor interior to all of the first plurality of rings.

* * * * *